Dec. 26, 1961 R. B. JERMAN ET AL 3,014,553
CENTRIFUGAL STEAM SEPARATOR
Filed April 8, 1959
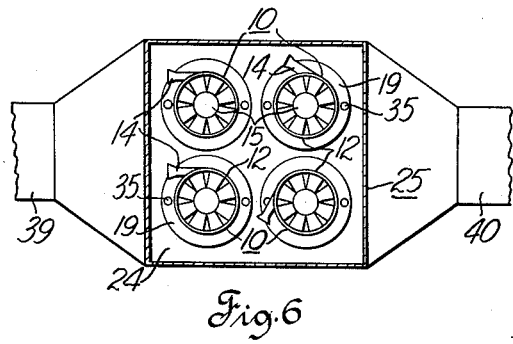
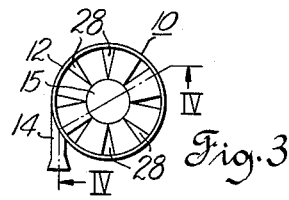
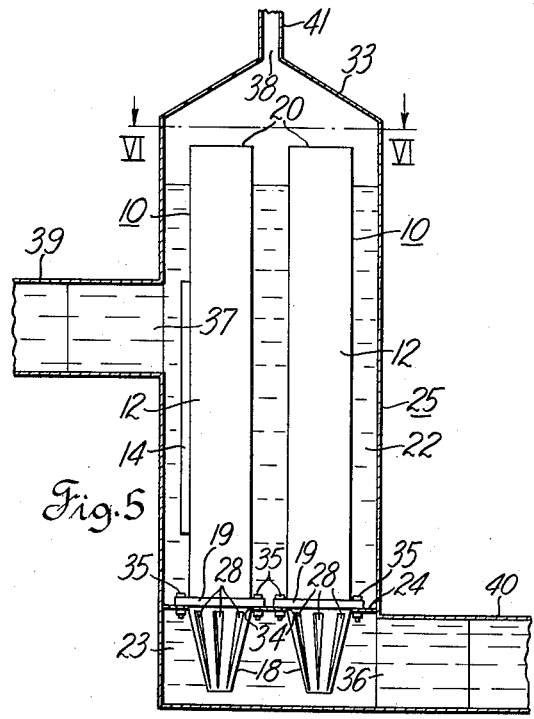
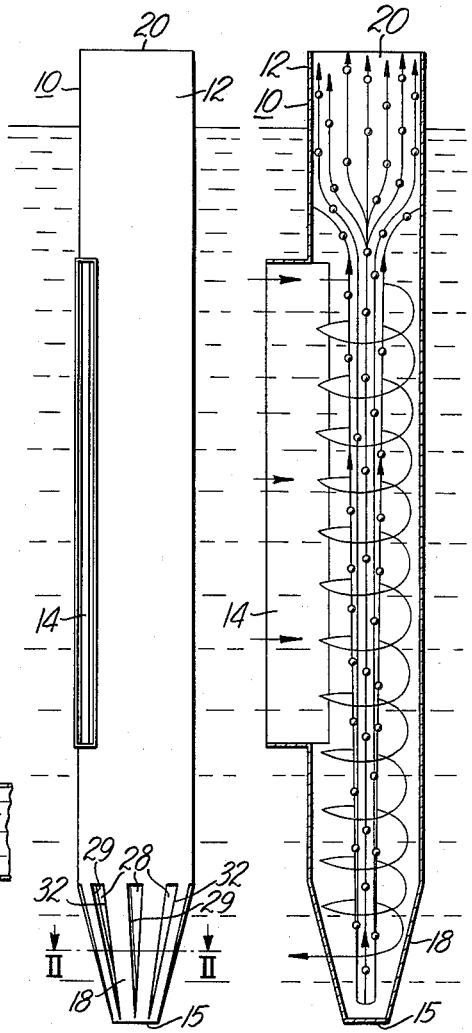
Inventors
Ralph B. Jerman
David H. Swanson
By Arthur M. Struck
Attorney

United States Patent Office 3,014,553
Patented Dec. 26, 1961

3,014,553
CENTRIFUGAL STEAM SEPARATOR
Ralph B. Jerman, West Allis, and David H. Swanson, Wauwatosa, Wis., assignors to Allis-Chalmers Manufacturing Company, Milwaukee, Wis.
Filed Apr. 8, 1959, Ser. No. 805,073
6 Claims. (Cl. 183—2.5)

This invention relates to improvements in and connected with separators for effecting the separation of gas from liquid by cyclonic or vortical action.

Separators of the above mentioned type usually comprise a vertically disposed casing having a cylindrical portion, a tangential gas-liquid mixture inlet defined in the cylindrical portion, a gas discharge port defined by the top of the cylindrical portion, and means disposed at the lower end of the casing for the discharge of the separated liquid. A single separator may be utilized, for example, by connecting a single separator in a liquid carrying conduit containing entrained gas or vapor. It is equally possible to utilize a plurality of separators connected in parallel as a unit and disposed in a totally enclosed vessel having regions that correspond to and communicate with each of the parts of the separator.

In the above described separators, the mixture enters the separator through the tangential inlet under pressure. The tangential inlet causes the mixture to swirl and centrifuges the liquid in the gas-liquid mixture to the outside walls. The separated liquid gravitates downward and is discharged through the bottom of the separator casing. The gas, being less dense, accumulates in the center and forms a vortex from where it flows upward out of the separator through the gas discharge port.

However, it was found in practice that the aforesaid centrifugal separators presented a problem when a small amount of gas is to be separated from a large volume of liquid. The velocity of the liquid passing through and out of such separators tended to draw the gas vortex formed in the separator below the liquid discharge port and thus permitted some of the separated gas in the vortex to reentrain in the liquid. This is known as carryunder. Some centrifugal separators reduce carryunder by discharging the liquid through an annular opening in the bottom of the casing concentrically spaced around the central axis of the separator casing. This reduces the carryunder, but at the same time the capacity is limited because the size of the annular opening must remain sufficiently narrow in order to insure complete separation of the discharged liquid and the gas vortex formed within the separator.

According to the present invention, a portion of the separator casing is provided that has a downwardly pointed frusto-conical configuration depending from the cylindrical portion of the separator. The lower end of the frustum is closed by an imperforate member. A plurality of circumferentially spaced discharge openings are provided in the periphery of the depending portion of the separator casing to provide tangential discharge of the liquid. By this arrangement the number of openings provided can be chosen so that their total discharge area will provide the capacity desired and yet none of the openings will have to extend inwardly toward the central axis far enough to reach the gas vortex. As long as none of the openings reach inwardly to the gas vortex, there will be little, if any, carryunder regardless of capacity or actual volume of liquid being handled. In the preferred embodiment, the openings are triangular shaped, and as the opening enlarges in an upward direction, the gas vortex is farther away. In other words, where the discharge opening is the largest, it is also the farthest away from the gas vortex.

It is therefore an object of this invention to provide a new and improved centrifugal separating device that has a discharge configuration that allows a large volume of liquid to pass therethrough and at the same time prevents gas carryunder.

Another object of this invention is to provide a new and improved centrifugal separator that will efficiently separate a very small amount of gas from a very large amount of liquid.

Another object of this invention is to provide a new and improved centrifugal separator that utilizes a tangential inlet and a tangential discharge to permit operation in a restricted area.

In the drawings, FIG. 1 is a side view of an embodiment of a separator according to the invention;
FIG. 2 is a sectional view of FIG. 1 at line II—II;
FIG. 3 is a top view of FIG. 1;
FIG. 4 is a sectional view of FIG. 3 at lines IV—IV;
FIG. 5 is a side sectional view of a separating device utilizing a plurality of the separators of this invention; and
FIG. 6 is a sectional view of FIG. 5 at line VI—VI.

Referring to the drawing and in particular FIGS. 1 to 4, the reference 10 designates a complete separator. The separator 10 has a cylindrical casing portion 12 positioned with its central axis in a vertical position. A tangential inlet 14 is provided in casing portion 12 for the introduction of the gas-liquid mixture into the separator 10. The upper end of the cylindrical casing portion 12 is open and defines a gas discharge port 20. At the lower end of the cylindrical casing portion 12, a frusto-conical casing portion 18 depends from the cylindrical casing portion 12 with its frustum pointing downwardly. An imperforate portion 15 closes the lower end of the frusto-conical casing portion 18 to prevent flow of fluid therethrough.

In the periphery of the frusto-conical casing portion 18, a plurality of vertically elongated openings of downwardly decreasing width in the form of meridian tapered slots 28 are circumferentially spaced to provide means to discharge the separated liquid. Each of the slots 28 are triangular, having the apex thereof pointing convergingly downward so that the center line of each triangular slot (see FIG. 1) passes through the apex of the slot and focuses upon a single point (see FIG. 3) located on an extension of the center line of cylindrical casing portion 12.

Referring to FIGS. 1 and 2, each of the tapered slots 28 defined in the frusto-conical casing portion 18 exposes edges 29 and 32 in casing portion 18. The frusto-conical casing portion 18 between edges 29 and 32 and across which the discharged liquid flows, is shown in cross section in FIG. 2 as being tapered so that edge 32 is a knife edge. The knife edge 32 provides a hydrodynamically designed edge that reduces turbulence of the discharged liquid flowing thereacross. This permits the separated liquid to "blend" into the liquid in which the discharge portion 18 is submerged with a minimum pressure drop.

It is generally preferred to utilize a plurality of separators 10 in an enclosed vessel. FIGS. 5 and 6 show four separators 10 connected in parallel to operate as a single unit within vessel 25.

Referring to FIG. 5, the vessel 25 is provided with a dome 33, a horizontally disposed partition wall 24, a gas-liquid mixture inlet 37, a gas discharge port 38, and a liquid discharge port 36.

Dome 33 has defined therein gas discharge port 38. A gas discharge conduit 41 may be connected to gas discharge port 38 to collect the separated gas as it leaves the vessel 25.

Partition 24 is suitably mounted, as by welding, to the inside walls of vessel 25 and divides vessel 25 into an upper chamber 22 and a lower chamber 23. Partition 24 encircles in a fluid tight fit each of the separators 10 so that fluid can pass from chamber 22 to chamber 23 only by passing through a separator 10.

The gas-liquid inlet 37 is provided in upper chamber 22 of vessel 25 intermediate dome 33 and partition 24 to provide for entry of a gas-liquid mixture into upper chamber 22. Means (not shown) may be provided to maintain the gas-liquid mixture level in the upper chamber 22 below the dome portion 33 of vessel 25, but above the gas-liquid mixture inlet 37. A gas-liquid mixture conduit 39 is connected to the gas mixture inlet 37 to provide supply means (not shown) for the gas-liquid mixture.

The liquid discharge port 36 provided in lower chamber 23 of vessel 25 may be connected to liquid discharge conduit 40 to collect the separated liquid.

As shown in FIG. 5, to mount the separators 10 within vessel 25, the lower end of cylindrical portion 12 of separator 10 is provided with a shoulder 19 that circumscribes and supports separator 10 on partition 24. Shoulder 19 is attached to separator 10, as by welding, and is removably mounted on partition 24, such as by bolts 35. The frusto-conical casing portion 18 of separator 10 extends downwardly through aperture 34 in partition 24 and communicates with lower chamber 23 of vessel 25.

The gas-liquid mixture level in upper chamber 22 is not permitted to rise over the tops of the separators 10 to prevent the gas-liquid mixture from flowing into the separator over the top thereof, and insure that the mixture enters separators 10 only through tangential inlet 14.

It is not significant to the operation of the separator 10 whether it operates singly or as a unit disposed within a closed vessel. In either instance, as shown in FIG. 4, a gas-liquid mixture is introduced into separator 10 under a suitable positive pressure head. The tangential inlet 14 causes the mixture to whirl about the central axis of separator 10 in a helical path and form a vortex. The liquid, being the heaviest portion of the gas-liquid mixture, is centrifuged to the separator walls. As the mixture rotates, the liquid passes downward into the frusto-conical casing portion 18. The tapered slots 28 defined in frusto-conical casing portion 18 permit the separated fluid to be discharged tangentially out of the separator 10 as indicated by arrows in FIG. 4. The gas, being less dense, accumulates in the vortex as shown in FIG. 4 and rises upwardly in separator 10 to be discharged out of separator 10 through the gas discharge port 20. This arrangement incurs a low pressure drop, the pressure drop being approximately three feet of water.

It is desirable that the bottom of inlet 14 be appreciably above the frusto-conical discharge 18, for example, a separator having a ten inch diameter, an overall length of eight and one half to nine feet, a tangential inlet four and one half feet long and one inch wide, the bottom of which is one foot above the frusto-conical discharge 18, and a one foot slotted frusto-conical liquid discharge portion constructed according to this invention has been tested and will handle up to 1,460 gallons of water per minute. Such a unit is rated at 1,250 gallons per minute. At the rated output, a single separator can handle 750,000 gallons per hour.

While but one embodiment of a separator and one embodiment of a bank of separators has been shown and described, further embodiments or combinations of those described herein will be apparent to one skilled in the art without departing from the spirit of the invention or from the scope of the appended claims.

What is claimed is:

1. A centrifugal separator comprising: a casing having a cylindrical portion positioned with its central axis in a vertical position; a gas discharge port defined by the upper end of said cylindrical portion of said casing; a tangential inlet disposed intermediate the upper and lower ends of said cylindrical portion of said casing to introduce a gas-liquid mixture into said casing; a casing portion depending from said lower end of said cylindrical portion, said depending portion having a frusto-conical configuration with its frustum pointing downwardly and an imperforate portion closing the lower end of said frusto-conical depending portion to prevent flow of liquid therethrough; and said depending frusto-conical casing portion defining a plurality of openings in the periphery thereof providing tangential discharge of liquid.

2. A centrifugal separator comprising: a casing having a cylindrical portion positioned with its central axis in a vertical position; a gas discharge port defined by the upper end of said cylindrical portion of said casing; a tangential inlet disposed intermediate the upper and lower ends of said cylindrical portion of said casing to introduce a gas-liquid mixture into said casing; a casing portion depending from said lower end of said cylindrical portion, said depending portion having a frusto-conical configuration with its frustum pointing downwardly and an imperforate portion closing the lower end of said frusto-conical depending portion to prevent flow of liquid therethrough; and said depending frusto-conical casing portion defining a plurality of downwardly pointing tapered slots in the periphery thereof providing tangential discharge of liquid, each of said slots having a center line that converges upon a single point positioned on an extension of the center line of said cylindrical portion of said casing.

3. A centrifugal separator comprising: a casing having a cylindrical portion positioned with its central axis in a vertical position; a gas discharge port defined by the upper end of said cylindrical portion of said casing; a tangential inlet disposed intermediate the upper and lower ends of said cylindrical portion of said casing to introduce a gas-liquid mixture into said casing; a casing portion depending from said lower end of said cylindrical portion, said depending portion having a frusto-conical configuration with its frustum pointing downwardly and an imperforate portion closing the lower end of said frusto-conical depending portion to prevent flow of liquid therethrough; and said depending frusto-conical casing portion defining a plurality of openings circumferentially spaced in the periphery there of providing tangential discharge of liquid, said openings having a triangular configuration with the apex thereof pointing downwardly, each of said triangles having a center line that passes through its apex, said center lines of said triangles focusing upon a single point located on an extension of said cylindrical portion center line of said casing.

4. A centrifugal separator comprising: a casing having a cylindrical portion positioned with its central axis in a vertical position; a gas discharge port defined by the upper end of said cylindrical portion of said casing; a tangential inlet disposed intermediate the upper and lower ends of said cylindrical portion of said casing to introduce a gas-liquid mixture into said casing; a casing portion depending from said lower end of said cylindrical portion, said depending portion having a frusto-conical configuration with its frustum pointing downwardly and an imperforate portion closing the lower end of said frusto-conical depending portion to prevent flow of liquid therethrough; and said depending frusto-conical casing portion having a peripheral portion defining a plurality of circumferentially spaced triangular openings providing tangential discharge of liquid, each of said triangular openings having a center line passing through its apex and converging upon a single point located on an extension of said cylindrical portion center line, and each part of said peripheral portions between two adjacent openings having a knife edge which in a cross section at a plane perpendicular to said central axis is viewed to be pointed in the same circumferential clock reference direction as said tangential inlet.

5. A centrifugal separator comprising: a casing having a cylindrical portion positioned with its central axis in a vertical position; a gas discharge port defined by the upper end of said cylindrical portion of said casing; a tangential inlet disposed intermediate the upper and lower ends of said cylindrical portion of said cylindrical portion of said casing to introduce a gas-liquid mixture into said casing; a casing portion depending from said lower end of said cylindrical portion, said depending portion having a frusto-conical configuration with its frustum pointing downwardly and an imperforate portion closing the lower end of said frusto-conical depending portion to prevent flow of liquid therethrough; and said depending frusto-conical casing portion defining a plurality of circumferentially spaced, vertically elongated openings of downwardly decreasing width in the periphery thereof providing tangential discharge of liquid.

6. A centrifugal separator comprising: a casing having a cylindrical portion positioned with its central axis in a vertical position; a gas discharge port defined by the upper end of said cylindrical portion of said casing; a tangential inlet disposed intermediate the upper and lower ends of said cylindrical portion of said casing to introduce a gas-liquid mixture into said casing; a casing portion depending from said lower end of said cylindrical portion, said depending portion having a frusto-conical configuration with its frustum pointing downwardly and an imperforate portion closing the lower end of said frusto-conical depending portion to prevent flow of liquid therethrough; and said depending frusto-conical casing portion having a plurality of circumferentially spaced meridian openings defined therein for tangential discharge of liquid.

References Cited in the file of this patent

UNITED STATES PATENTS

| | | |
|---|---|---|
| 415,368 | Reitz | Nov. 19, 1889 |
| 1,238,829 | Schneible | Sept. 4, 1917 |
| 1,353,431 | Sims | Sept. 21, 1920 |
| 1,753,972 | Schutz | Apr. 8, 1930 |
| 2,530,112 | Arnold | Nov. 14, 1950 |
| 2,788,087 | Lenehan | Apr. 9, 1957 |